Oct. 22, 1940.   C. N. ALTER   2,219,169
ADJUSTABLE CAMERA HOLDER FOR AUTOMOBILES
Filed Oct. 20, 1938   2 Sheets-Sheet 2
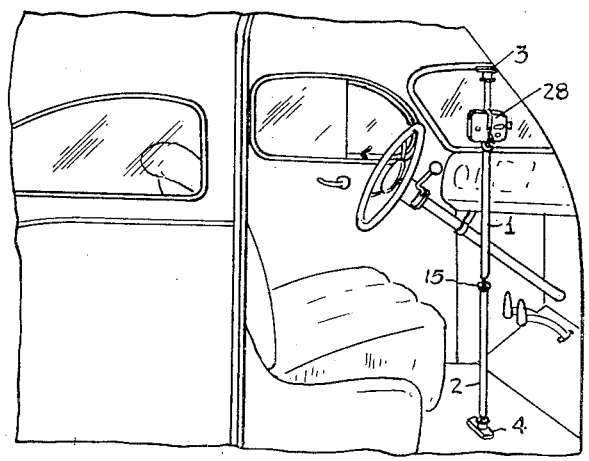
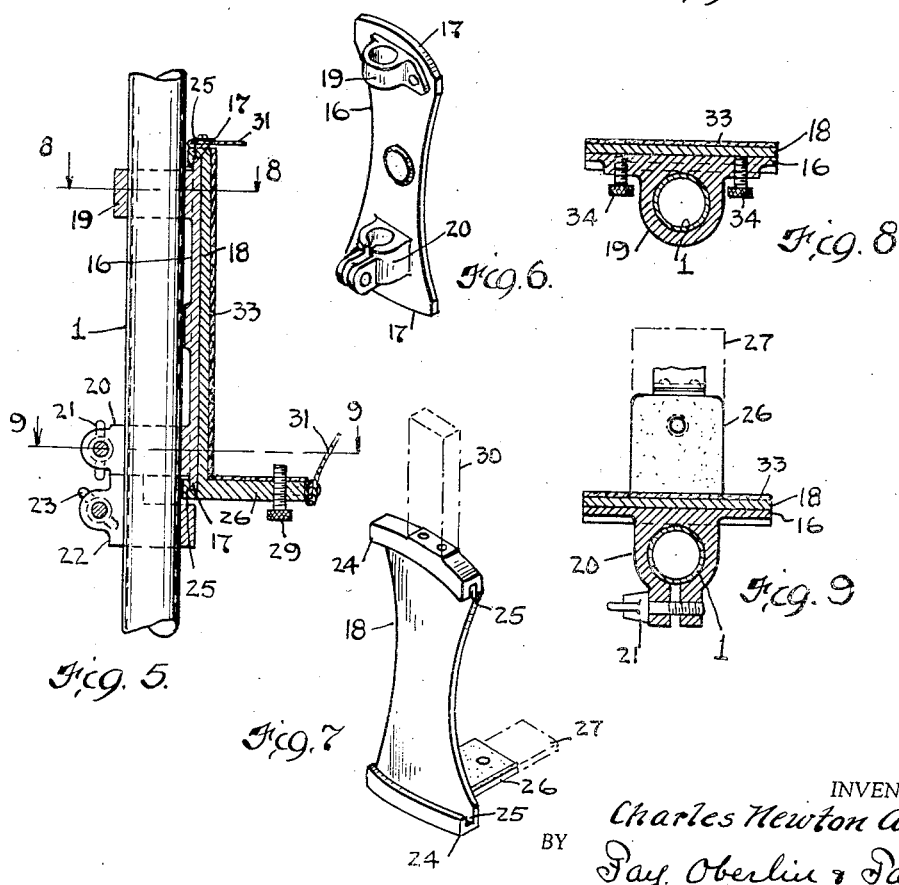
INVENTOR.
Charles Newton Alter
BY Fay, Oberlin & Fay
ATTORNEYS.

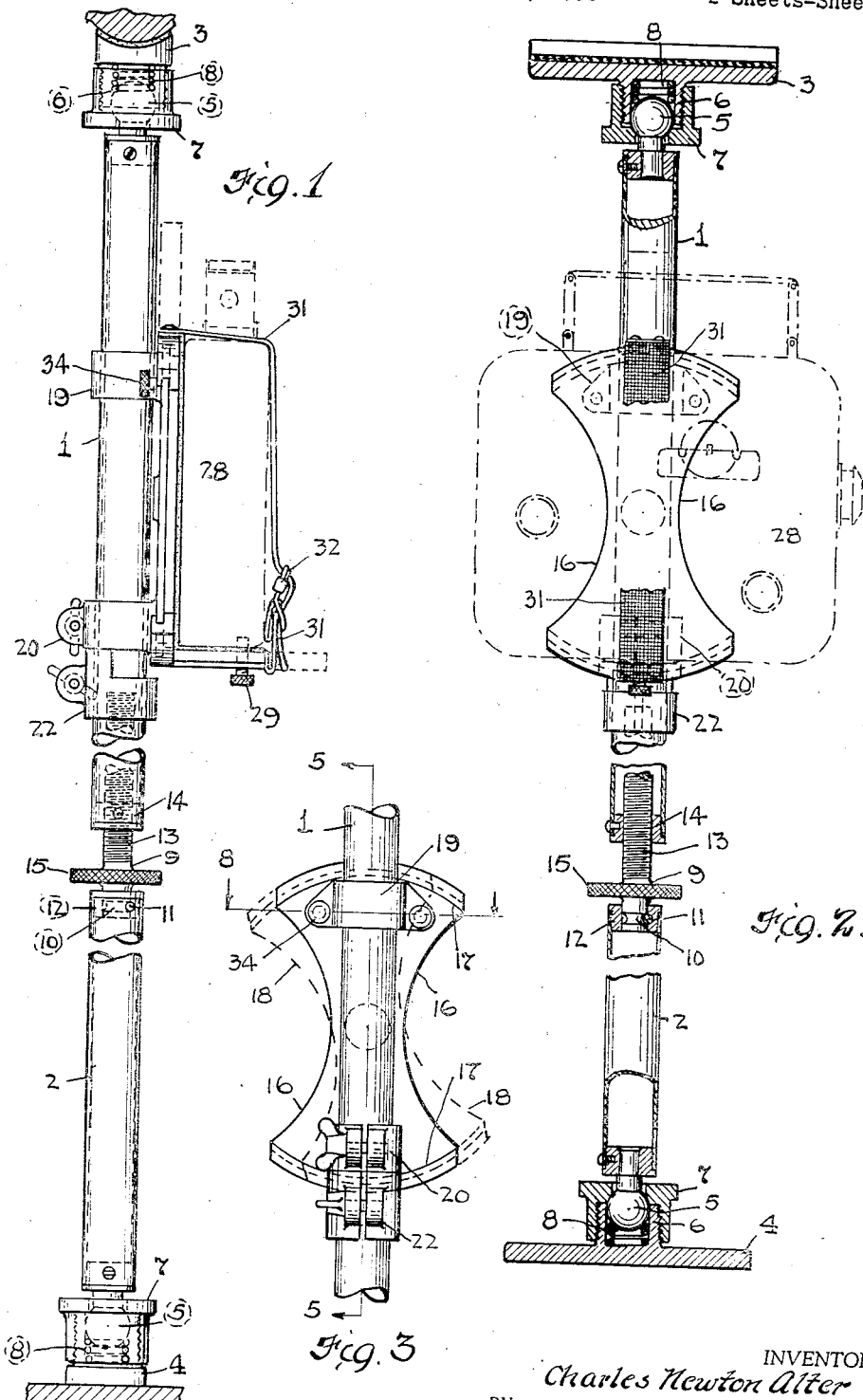

Patented Oct. 22, 1940

2,219,169

UNITED STATES PATENT OFFICE 2,219,169

ADJUSTABLE CAMERA HOLDER FOR AUTOMOBILES

Charles Newton Alter, Alliance, Ohio

Application October 20, 1938, Serial No. 236,054

3 Claims. (Cl. 248—1)

This invention relates to a device which may be mounted in an automobile, back of the windshield, for the purpose of holding a movie camera and the like, whereby a driver, while driving, may shoot through the windshield and secure moving pictures of the country through which he is passing. An object of the invention is to provide a mounting which will so hold a camera that there will be substantially no vibration of the camera in respect to such mounting. A further object is to provide a mounting which may readily be installed and removed from a car and which in use will permit adjustment of the camera to a desired position simply and quickly.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various structural forms in which the principle of the invention may be used.

In said annexed drawings:

Fig. 1 is a side elevational view of my invention, partly in cross-section;

Fig. 2 is a rear elevational view of same, also partly in cross-section;

Fig. 3 is a partial rear view showing the brackets by which the camera mounting is rotatable about a supporting adjustable strut;

Fig. 4 is a partial view of an automobile showing my invention installed for use;

Fig. 5 is a cross-sectional side view showing the camera mounting and the brackets rotatably supporting it on an adjustable strut;

Fig. 6 is an elevational view of the half of the mounting which is affixed on the adjustable strut by brackets, permitting rotation;

Fig. 7 is an elevational view of the half of the mounting upon which the camera is affixed;

Fig. 8 is a cross-sectional view of Fig. 5, taken on the line 8—8; and

Fig. 9 is a cross-sectional view of Fig. 5, taken on the line 9—9.

A preferred form in which I have embodied my invention is shown in the drawings, wherein an adjustable strut composed of tubular members 1 and 2, is provided at the top with a rest 3 adapted to engage the upper member of the windshield frame of a car, and at the bottom with a long narrow foot 4 adapted to rest upon the floor boards thereof. The rest 3 and foot 4 are mounted on the respective ends of the strut members 1 and 2 by ball and socket joints, most clearly shown in Fig. 2. The balls 5 mounted on the strut members fit into sockets 6 carried by the rest 3 and foot 4, respectively, and are held therein by the internally threaded caps 7, which are operative to draw said balls 5 against compression spring 8.

An adjusting rod 9 connects the tubular members 1 and 2 of the strut and has one end rotatably mounted in the upper end of said member 2 by a circumferential groove 10 engaging a pin 11 mounted through the said member 2 and a bushing 12 therein. The other end of the rod 9 carries a screw thread 13 which engages the internally threaded bushing 14 mounted in the end of said member 1 of the strut. A knurled head 15 mounted on the rod 9 permits rotation thereof with a resultant movement of member 1 toward and away from member 2.

A camera mounting, best shown in Fig. 5, comprises a plate 16, having outer edges 17 which define quadrants of a circle and a second plate 18 mounted thereon as hereinafter explained. Plate 16 is mounted on bearings 19 and 20 which are slidably and rotatably mounted on the tubular member 1. Bearing 20 is split and may be tightened by the screw 21. A split collar 22 is slidably mounted on member 1, below bearing 20, and is adapted to be locked in adjusted position by the screw 23.

In shape, plates 16 and 18 are substantially central zones of circular plates. On plate 18 axially extended flanges 24 are formed on the arcs of the outer edges. Grooves 25 in said flanges 24 face toward the axis of the circle defined by the said flanges and are so formed that the outer edges 17 of plate 16 may be fitted closely therewithin. On the side of plate 18 opposite one of said flanges 24, a flat extension 26 is carried normal to said plate 18, which extension is formed with extra length as shown at 27 that it may be cut to the proper length to receive a camera 28 which is held in position thereon by the screw 29 which preferably will be of the size and thread used with said camera when mounting on a tripod. Also in forming plate 18 it is desirable that an upwardly projecting lug 30 extended radially, be formed centrally on the outer edge of the other flange 24. This lug 30 will be cut to the height of the camera to be mounted. Straps 31, with a slip buckle 32 connecting them, are mounted respectively on the extension 26 and the lug 30, when these have been cut to the proper dimensions. Preferably, the outer side of plate 18 and of the connecting surface of extension 26 will be covered with felt 33 or similar material.

Set screws 34 mounted through plate 16 bears upon plate 18 and holds the latter in adjusted position.

In use the strut will be placed in the automobile in a desired position where the manipulation thereof will be convenient for the operator. The rest 3 will be placed in engagement with a fixed object such as the upper molding of the windshield and the foot 4 will rest on the floor boards. By means of the knurled head 15, the screw thread 13 on the rod 9 will force members 1 and 2 apart until the strut is tightly held between the molding and the floor boards. A camera 28 is fastened on the extension 26 by the screw 29, and is strapped to plate 18 which is then positioned on the plate 16. The collar 22 is locked by screw 23 at the height at which it is desired to operate the camera. Said camera is then rotated by means of the bearings 19 and 20 to the desired horizontal angle and bearing 20 is locked by screw 21. By rotation of plate 18 on plate 16, the desired angle of elevation is secured at which the camera is held by tightening one of the set screws 34.

With these settings made, the driver of a car may intermittently shoot desired scenes without interruption of his driving. Also the adjusting means are so conveniently arranged that readjustment may be made while driving.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a support for mounting a camera within an automobile, the combination of a strut comprising upper and lower members and means operative to adjust the distance between said members of said strut and mount same between fixed bodies in vertical relation in the interior of such automobile; an element mounted on said strut, said element being provided with marginal portions defining opposing sectors of a circle in a plane parallel to the axis of said strut; and a second flat element mounted adjacent and parallel to said first element, said second element comprising means to engage and firmly hold a camera and marginal portions defining opposed sectors of a circle, which marginal portions are operative to engage the said marginal portions of said first-named element and to restrict relative movement therebetween to rotative movement about a common axis normal thereto.

2. In a support for mounting a camera within an automobile, the combination of a strut comprising upper and lower members and means operative to adjust the distance between said members of said strut and mount the same between fixed bodies in vertical relation in the interior of such automobile; a plate mounted on said strut in a plane parallel to the axis thereof, said plate having marginal edges defining sectors of a circle; a second plate mounted adjacent and parallel to said first plate and comprising means to engage and firmly hold a camera; and means carried by said second plate operative to engage said sector edges and restrict relative movement between said plates to rotation about a common axis normal to said plates, said means comprising sector flanges extended axially, which flanges are provided with axially facing grooves defining a circle and operative to encompass said edges of said first plate.

3. In a support for mounting a camera within an automobile, the combination of a strut comprising upper and lower members and means operative to adjust the distance between said members of said strut and mount the same between fixed bodies in vertical relation in the interior of such automobile; a plate mounted on said strut in a plane parallel to the axis thereof, said plate having marginal edges defining sectors of a circle; a second plate mounted adjacent and parallel to said first plate, said second plate having marginal edges defining sectors of a circle and comprising means operative to engage and firmly hold a camera; and means carried by one of said plates operative to engage the sector edges of the other plate and restrict relative movement between said plates to rotation about a common axis normal to said plates, said means comprising sector flanges extended axially, which flanges are provided with axially facing grooves defining a circle and operative to encompass said sector edges of said other plate.

CHARLES NEWTON ALTER.